Dec. 5, 1944.  J. MIHALYI  2,364,381
ROLL HOLDING CAMERA
Filed Jan. 14, 1942

JOSEPH MIHALYI
INVENTOR

BY
ATTORNEYS

Patented Dec. 5, 1944

2,364,381

UNITED STATES PATENT OFFICE 2,364,381

ROLL HOLDING CAMERA

Joseph Mihalyi, Rochester, N. Y., assignor to Eastman Kodak Company, Rochester, N. Y., a corporation of New Jersey Application January 14, 1942, Serial No. 426,744

9 Claims. (Cl. 242—71)

This invention relates to photography and more particularly to roll film cameras.

One object of my invention is to provide a roll holding camera which is simple to load and in which the loading operation can be carried out with a minimum number of operations. Another object of my invention is to provide a camera with a single cavity or recess for receiving a film cartridge so that in loading the camera the film cartridge may be both inserted and removed through a single opening in a camera wall. Another object of my invention is to provide a novel type of film cartridge supporting structure which is simple to make and easy to operate. Another object of my invention is to provide a means by which the type of film loaded into the camera can be ascertained from the exterior thereof and other objects will appear from the following specification, the novel features being particularly pointed out in the claims at the end thereof.

Coming now to the drawing wherein like reference characters denote like parts throughout:

In most roll holding cameras now on the market, it is necessary in order to load film into the camera to move a camera back or to remove a roll holder from the inside of the camera to place a film spool in a take-up chamber to place a film cartridge in a supply chamber and to draw the film backing paper through the required path and attach it to the take-up film spool. After this has been done, it is necessary to replace the roll holder or close the camera back as the case may be and then wind up to the first film area, watching for the numeral on the film backing paper to appear in the window usually formed in the back of the camera. It frequently happens that the particular means for supporting the film spools are somewhat difficult to operate and the entire operation takes considerable time and sometimes some little skill. Moreover, when a film cartridge has been loaded into a camera it sometimes happens that the user forgets what type of film is loaded in the camera.

My present invention is directed to overcoming some of these difficulties in that the camera broadly consists of a body having a single door or aperture through which the loading and unloading operation may take place, so that the threading of the film in the usual manner may be completely eliminated. In addition, I prefer to provide a light-tight enclosure between the end of the film cartridge and the camera which will permit indicating marks noting the kind of film or indicating signals such as various colors to appear through a window in a wall of a camera, thus making it a simple matter at any time to determine the type of film which has been loaded into the camera.

Figure 1:
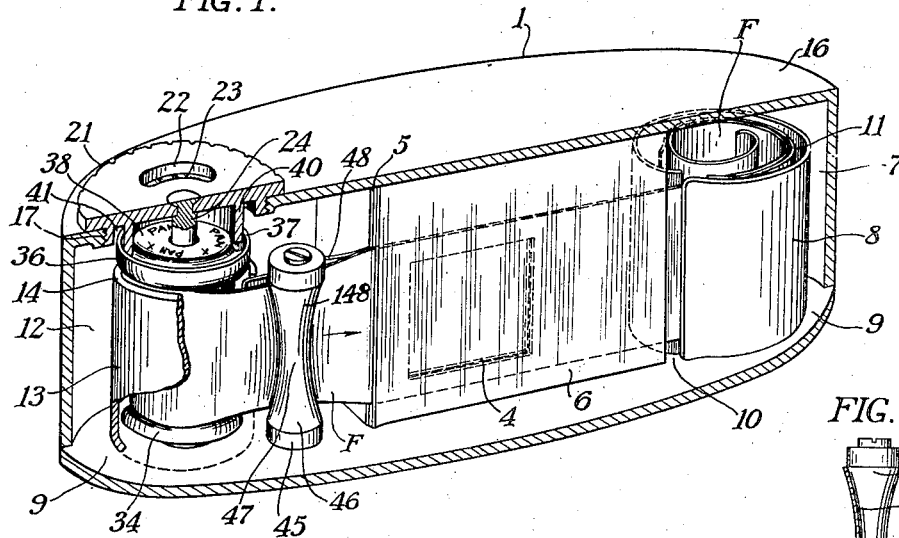
Fig. 1 is a perspective view partially in section showing a preferred embodiment of my invention.
Figure 5:
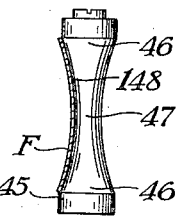
Fig. 5 is an enlarged showing of a film guiding roller with a film shown in section lying against the roller.
Figure 2:
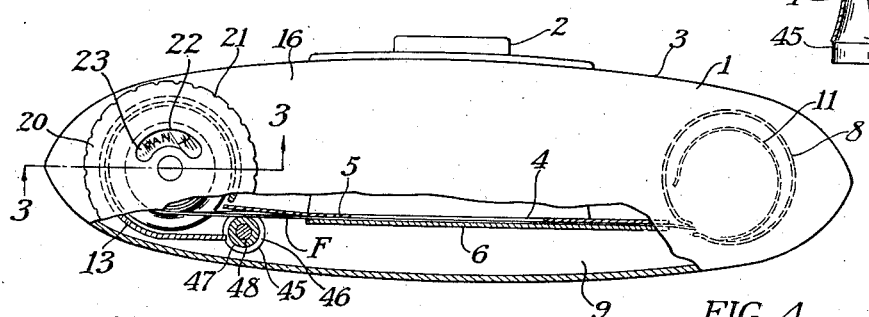
Fig. 2 is a top plan view partially broken away and partially in section of the camera shown in Fig. 1.
Figure 4:
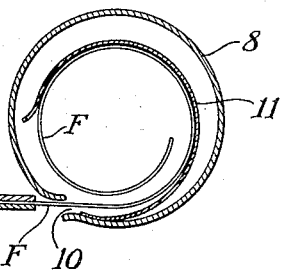
Fig. 4 is a fragmentary sectional detail showing a portion of the take-up film chamber used in the camera shown in the preceding figures.

Coming now to the drawing in which like reference characters denote like parts throughout, a preferred embodiment of my invention may consist of a camera designated broadly as 1 which may have an objective carried by a lens cell 2 on the front wall 3 of the camera body. Inside the camera body there is a film gate indicated at 4, this gate consisting of two sections, an exposure frame 5, and a rear plate 6 spaced from the exposure frame 5 a distance to permit a film F to be moved therethrough. There is a take-up spool chamber 7 at one end of the exposure frame 5 and this chamber preferably includes, as shown in Fig. 4, a cylindraceous casing 8 which may be carried by the bottom wall 9 of the camera or by other suitable walls and which includes an opening 10 through which a film F may pass into the chamber 8. This cylindraceous chamber may include a light spring 11 helping the film to coil in a loose coil when it is propelled into this chamber.

Figure 3:
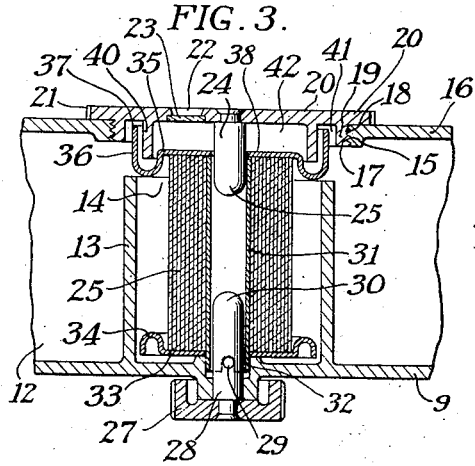
Fig. 3 is an enlarged fragmentary section on line 3—3 of Fig. 2.

On the opposite end of the camera there is a recess 12 in the camera which may contain a cylindraceous container 13 forming a supply spool chamber and mounted on either the bottom wall 9 or on other suitable walls of the camera body. This cylindraceous member as best shown in Fig. 3 is completely open at the top 14 and lies directly beneath a circular opening 15 in the top wall 16 of the camera, this opening being preferably threaded at 17 to receive the threaded portion 18 carried by an annular flange 19 of the cap 20. This cap is preferably serrated at 21 to facilitate removal and to facilitate properly seating the cap when a film has been loaded into the camera. The cap 20 carries a window 22 which may be covered by a suitable clear or colored transparent material 23. The cap also carries a spool centering pin 24 having a rounded end 25.

On the bottom wall 9 of the camera there is preferably arranged a winding knob 27, this knob carrying a shaft 28 which in turn carries a winding key 29, the shaft being extended upwardly a material distance as indicated at 30.

A special type of spool is preferably employed consisting of a hub member 31 with a toothed annular end 32 extending into a position to engage the winding key pin 29. The hub supports a pair of differently shaped flanges, flange 33 having an inwardly rolled edge 34 and flange 35 having a similarly rolled flange 36 except for the annular upstanding cylindrical edge 37. It should be noticed that the diameter of the flange 33 is less than the diameter of the cylindrical pocket 13 so that it may slide freely therein and that the diameter of the flange 35 is greater than the diameter of the cylindraceous container 13 so that the spool may only be loaded into the camera in one direction. The diameters of the cap 20 and the opening 15 are of course greater than that of the flange 35 but, when the spool is completely loaded into the camera, I prefer to have the upstanding flange close to the outside of wall 16 so that it may be readily grasped by an operator in unloading the camera.

The flange 35 is preferably provided with some type of indicating mark on the upper wall 38 to indicate the type of film with which the camera is loaded. Such indicating markings may consist of various colors or the upper flange may be provided with various letters or other indicating symbols to denote the type of film.

The cap 20 is provided with an annular downwardly extending flange 40 so that, between this flange and the flange 19 which is threaded, there exists a space 41 into which the upwardly extending flange 36 of the film spool may project. This overlapping of annular flanges provides a light-tight connection so that the pocket 42 formed between the cap and the film spool flange may receive light through the window 22 without permitting any of this light to reach the light-sensitive film F. By glancing through the window 22 a camera user will always see the type film with which the camera is loaded.

Between the film cartridge and the exposure frame I prefer to mount a film roller 45 so that it may rotate freely. This roller is of unusual construction and, as indicated in my copending application Serial No. 430,789, filed February 13, 1942, now Patent No. 2,336,278, Dec. 7, 1943, includes end areas 46 of considerably greater diameter than the center area 47. I preferably provide smoothly curved walls 148 since these walls may bend a film transversely as it passes over the roller so as to accomplish several functions. In the first place it is desirable to bend the film so that it may be withdrawn from between the rims 34 and 36 of the flanges which are closer together than the width of the film. These flanges may be of springy material or, if desired, they may be of rigid material. The shape of the formings is somewhat exaggerated in the drawing to more clearly illustrate the structure. If a film is propelled from the supply chamber the end will contact first with the roller 45 and by bending the film transversely it will facilitate the removal of the film from the spool. In addition, by bending the film it will press the end toward the inwardly extending portion 48 of the exposure frame 5, directing it into the space lying between the gate sections 5 and 6. Continued movement of the film will cause it to pass into the take-up chamber and to coil loosely inside of the spring 11 as indicated in Fig. 4.

It is my intention to provide a camera in which the film is loaded into a single opening and in which, by turning a winding key, the film is threaded through the camera by merely unwinding the film from the supply spool. The end of the film is fixedly attached to the spool core so that all an operator needs to do is turn the knob 27 until the film is completely unwound. He is now ready to make exposures and, by turning the knob intermittently in a reverse direction, the film is drawn back again onto the loading spool one area at a time. This may be accomplished by viewing exposure numbers on film backing paper through a camera window in the usual manner, but I prefer to provide a film cartridge without backing paper but with a light-proof backing on the film itself. If this is done some automatic means for measuring film, such as shown in my copending application above referred to, may be employed.

The operation of loading a camera is extremely simple. The operator unscrews the cap 20 through the knurled edge 21 and if a film spool is in the chamber he may remove it either by turning the camera upside down and letting the spool slide out or by lifting the spool out by the upstanding flange 37. To load a fresh spool of film into the camera the film spool is merely dropped into the uncovered opening. This will cause the hub to engage the rounded end 30 of the key winding post 29 and slide down into its proper position. Since the spool flange 38 will not go into the cylindraceous container 13, it is impossible to load the film spool improperly. With the film seated on the winding key, the cap 20 is positioned by entering the pin 25 into the hub 31 and by turning the cap 20 rapidly into place. While it is possible, of course, to move the film by means of the winding key 27 one area at a time for making successive exposures as the film is moved away from the supply spool chamber, I prefer to operate the camera by turning the knob 27 until the film is completely unwound into the chamber 8 and to make exposures as the film is wound backwardly again onto the supply spool. Regardless of the way that the film is wound, it is unnecessary to thread a second spool in the camera and to manually position a film or its backing paper from a supply to a take-up spool and across an exposure aperture. Thus the entire operation of loading a camera is greatly facilitated and it can be accomplished in a very few moments.

In addition, the construction of the camera permits the end of the film spool to be viewed at all times and any indicia or other indicating means on the end of a film spool may be readily viewed while the operation of taking pictures takes place.

What I claim and desire to secure by Letters Patent of the United States is:

1. In a roll holding camera, the combination with a camera body of a spool chamber therein, a cover for the spool chamber carried by a wall of the camera and including spaced annular flanges, a window in said cover, a thread on one flange for attaching said cap to the camera, said spool chamber being adapted to receive a film spool with an upstanding annular rim on one spool flange, said spaced annular flanges providing a groove to receive the annular rim on the spool flange to form a light-tight connection therewith.

2. In a roll holding camera, the combination with a camera body of a spool chamber therein, a cover for the spool chamber carried by a wall of the camera and including spaced annular flanges, a window in the cover, a thread on one flange for attaching said cover to the camera, said spool chamber being adapted to receive a film spool with an upstanding annular rim on one spool flange, said spaced annular flanges providing a groove to receive the annular rim on the spool flange to form a light-tight connection therewith, and a spool centering pin carried by the cover centrally of the annular flanges.

3. In a roll holding camera, the combination with a camera body of a spool chamber therein, a cover for the spool chamber carried by a wall of the camera and including spaced annular flanges, a thread on one flange for attaching said cover to the camera, said spool chamber being adapted to receive a film spool with an upstanding annular rim on one spool flange, said spaced annular flanges providing a groove to receive the annular rim on the spool flange to form a light-tight connection therewith, and a window in the cover member positioned inside the annular flanges for viewing the end of a film spool in the camera.

4. In a roll holding camera for use with film spools having flanges of different diameters, the combination with a camera body of a cylindraceous spool chamber therein of a diameter to receive the small flange of the film spool but not the large flange thereof, an annular cover of larger diameter than the cylindraceous chamber and larger than the diameter of the larger of the two spool flanges and positioned axially with respect thereto, film spool supports including a centering pin and winding key post, one carried in the spool chamber and the other by the annular cover, and a roughened area on said cover to facilitate the removal of the cover to load a film spool axially into the chamber and onto the film spool supports with the large spool flange adjacent the cover of the spool chamber.

5. In a roll holding camera for use with film spools having film indicating indicia on the ends of the spools and including an upstanding annular flange surrounding said indicia and including, in combination, a camera body, a spool chamber therein, a cover for the spool chamber having a window therein through which said indicia may be viewed and means carried by the cover for forming a light-tight connection with the upstanding flange on the film spool whereby the indicia on the spool flange may be viewed without exposing film to light passing through said window.

6. In a roll holding camera, the combination with a camera body having walls, one including an aperture, of a cap to cover the aperture, means for attaching the cap to a wall of the camera body, a window in the cap, an annular wall extending into the camera body from the cap and encircling said window, a film spool chamber in alignment with the cap, a spool in said chamber including a flange, an annular rim on the flange extending to a position adjacent to and in telescopic relation to the annular wall on the cap and forming a light-tight connection therewith.

7. In a roll holding camera for use with film spools having film indicating indicia on the ends of the spools and including, in combination, a camera body, a spool chamber therein, a cover for the spool chamber having a window therein and means carried by the cover for forming a light-tight connection with a flange of said film spool whereby the indicia on the film spool flange may be viewed through the window in the cover without exposing the film to light.

8. In a roll holding camera, the combination with a camera body having walls, one wall including an aperture, of a cap to cover the aperture, means for attaching the cap to a wall of the camera body, an annular wall extending into the camera body from the cap, a window in the cap inside of the annular wall, a film spool chamber in alignment with the cap, a spool in said chamber including a flange, an annular rim on the flange lying close to and forming a light-tight connection with the annular wall of the cap to form a light-tight compartment therewith, and indicia on the spool flange inside of the rim thereof positioned to be viewed through said window in the cap.

9. In a roll holding camera, the combination with a camera body, of a spool chamber enclosed within the camera body except for a threaded aperture adjacent the spool chamber, a cover for the spool chamber aperture carried by the camera comprising an annular flange member, a thread carried thereby for engaging the threaded aperture of the camera body, a window formed in the cover, and an annular flange spaced from the threaded flanged member portion of the cover forming therewith an annular groove to receive a substantially complementary-shaped spool flange.

JOSEPH MIHALYI.